United States Patent
Oldenettel

[11] Patent Number: 6,112,587
[45] Date of Patent: Sep. 5, 2000

[54] METHOD FOR ASSIGNING THE WHEEL POSITION TO TIRE PRESSURE CONTROL DEVICES IN A TIRE PRESSURE CONTROL SYSTEM OF A MOTOR VEHICLE

[75] Inventor: Holger Oldenettel, Garbsen, Germany

[73] Assignee: Continental Aktiengesellschaft, Hannover, Germany

[21] Appl. No.: 09/131,910

[22] Filed: Aug. 10, 1998

[30] Foreign Application Priority Data

Aug. 8, 1997 [DE] Germany .............................. 197 34 323

[51] Int. Cl.$^7$ .................................................. B60C 23/04
[52] U.S. Cl. ...................... 73/146.5; 340/445; 340/446; 340/447
[58] Field of Search .................... 73/146, 146.2, 73/146.3, 146.4, 146.5, 146.8, 118.1; 340/438, 442, 445, 446, 447, 448

[56] References Cited

U.S. PATENT DOCUMENTS

| | | | |
|---|---|---|---|
| 5,218,862 | 6/1993 | Hurrell, II et al. | 73/146.5 |
| 5,569,848 | 10/1996 | Sharp | 73/146.2 |
| 5,604,307 | 2/1997 | Iida et al. | 73/146.2 |
| 5,675,314 | 10/1997 | Chaklader | 73/146.5 |

FOREIGN PATENT DOCUMENTS 4205911  9/1993  Germany .

*Primary Examiner*—Eric S. McCall
*Attorney, Agent, or Firm*—Walter Ottesen

[57] ABSTRACT

The invention relates to a method for carrying out the allocation of the wheel position to tire pressure control devices (6a to 6d) in a tire pressure control system of a motor vehicle. The tire pressure control devices (6a to 6d) transmit their individual identifiers to the central unit (10) of the tire pressure control system at pregiven time intervals. The individual identifiers are transmitted at transmitting time points. At these time points, the wheel assumes a defined angular position so that a defined angular offset is present between two transmission time points. The rotation signals, which are supplied by the rpm sensors (4a to 4d), are checked in the central unit (10) as to which rotation signal exhibits the same angular offset. In the central unit (10), the tire pressure control devices (6a to 6d) are allocated to that wheel position whose rpm sensor (4a to 4d) likewise has measured the pregiven angular offset.

5 Claims, 6 Drawing Sheets

METHOD FOR ASSIGNING THE WHEEL POSITION TO TIRE PRESSURE CONTROL DEVICES IN A TIRE PRESSURE CONTROL SYSTEM OF A MOTOR VEHICLE

BACKGROUND OF THE INVENTION

For reasons of safety, the tire pressure of tires of a motor vehicle must be regularly checked which is often not done by the driver of a motor vehicle for various reasons. Accordingly, tire pressure control systems have been developed which include a tire pressure control device allocated to each wheel. The tire pressure control device automatically measures the tire pressure of the vehicle tire and announces at least a critical deviation from the desired tire pressure to the driver of the vehicle. The tire pressure control devices can, for example, be vulcanized into the tires or attached with adhesive or attached to the valve or at the wheel rim. Appropriate configurations are known.

German patent publication 4,205,911 discloses a tire pressure control system wherein each tire of the motor vehicle is assigned a corresponding tire pressure control device. At regular intervals, each tire pressure control device transmits a measured pressure signal together with an individual identifier to a central unit. The transmission of the individual identifier prevents the situation that the data, which is transmitted to the central unit, can be confused, for example, with data which is transmitted from another motor vehicle. In the central unit, value pairs (identifier of tire pressure control device/wheel position) are stored for each wheel so that a conclusion can be drawn in the central unit via a corresponding comparison as to which identifier is transmitted with the corresponding pressure signal from which wheel position of the vehicle. A deviation of the transmitted pressure signal from a pregiven value at a wheel position is indicated to the driver of the motor vehicle by the central unit so that the driver can initiate suitable measures.

German patent publication 4,205,911 discloses that the tire pressure control system can only function without difficulty when the allocations (identifier of the tire pressure control devices/wheel position) are properly stored in the central unit. Correspondingly and at least after each change of tires on the vehicle, a new allocation must be undertaken which takes place in an allocation mode of the tire pressure control system. In the tire pressure control system disclosed in German patent publication 4,205,911, a new allocation is carried out in that the intensity of the signals, which are transmitted from the individual tire pressure control devices, is measured by receivers (of which one each is fixedly assigned to a wheel position) and each signal (which is transmitted from a tire pressure control device) is assigned to the wheel position of the vehicle at which it generates the highest signal intensity. For example, the signal intensity of the tire pressure control device, which is located in the forward left tire, is the largest at the receiver, which is allocated to the forward left wheel position, so that a corresponding allocation can be determined. The corresponding allocations are stored in the central unit.

For the allocation method explained, a receiver is needed each wheel position of the motor vehicle whereby the costs of the tire pressure control system are driven upwardly for the system disclosed in German patent publication 4,205,911. A tire pressure control system is disclosed in U.S. patent application Ser. No. 08/854,269, filed May 9, 1997, and incorporated herein by reference. In this system, a new allocation of the tire pressure control devices to the wheel positions is carried out with the aid of only one receiver in the motor vehicle so that a cost advantage results compared to the tire pressure control system disclosed in German patent publication 4,205,911.

The basic idea in the above-identified U.S. patent application Ser. No. 08/854,269 is that a measured quantity is measured at each wheel position of the motor vehicle by two independent measuring devices. The wheel position is known from a first measuring device and the second measuring device is a component of the tire pressure control device which is located in the tire of the wheel of the motor vehicle. The first measuring device can, for example, be an ABS sensor and the second measuring device can be a rotation sensor which is assigned to the particular tire pressure control device. With the sensors, the rpms of the wheels of the vehicle are measured in the allocation mode independently of each other and the identifier of a tire pressure control device is allocated to that wheel position at which the same rpm was measured by the ABS sensor and a rotation sensor.

The tire pressure control devices to which the rotation sensors are allocated are only transmitters which themselves can receive no data. For this reason, the data cannot be transmitted to the tire pressure control devices that a new allocation must be carried out in the tire pressure control system because of a change of tires. The tire pressure control devices in the wheels of the vehicle must therefore assume that the tire pressure control system is continuously in the allocation mode. For this reason, the number of rotations of the wheels is measured continuously by the rotation sensors and the picked-up signal is continuously amplified so that an adequate signal strength is present. This loads the batteries of the tire pressure control devices whereby their service life is reduced. A desired battery service life of at least five years is difficult to achieve because of this loading.

SUMMARY OF THE INVENTION

It is an object of the invention to provide a method for allocating a tire pressure control device to a wheel position in a tire pressure control system of a motor vehicle wherein the energy consumption of the energy store of the tire pressure control devices can be minimized. It is also an object of the invention to provide a tire pressure control device with which the method can be carried out.

In the tire pressure control system of the invention for a motor vehicle having a plurality of wheels at respective predetermined wheel positions, a method is provided for carrying out an allocation of tire pressure control devices of a tire pressure control system to the predetermined wheel positions of the motor vehicle. The system further includes: a central unit; each of the tire pressure control devices functioning to transmit an individual identifier to the central unit at time intervals and being assignable to a corresponding one of the wheels and the assignment (identifier/wheel position) can be stored in the central unit; a plurality of rpm sensors assigned to corresponding ones of the wheels and the rpm sensors being fixedly mounted at respective ones of the wheel positions; the central unit storing the allocation of the rpm sensors to the wheel positions, respectively; a plurality of rotation sensors assigned to corresponding ones of the tire pressure control devices. The method includes the steps of: switching on any one of the rotation sensors for a first time interval ($I_1$) whereby the rotation sensor supplies a rotation sensor signal; during the first time interval ($I_1$), determining a first angular position of the one wheel to which the one rotation sensor is assigned from the rotation sensor signal; the tire pressure control device corresponding to the one wheel transmitting the individual identifier thereof to the central unit at a first time point ($t_1$) when the wheel assumes the first angular position; later switching on the one rotation sensor for a second time interval ($I_2$); during the second time interval ($I_2$), determining a second angular position of the one wheel to which the one rotation sensor is assigned from the rotation sensor signal; the tire pressure control device corresponding to the one wheel transmitting the individual identifier thereof to the central unit at a second time point ($t_2$) when the one wheel assumes the second angular position with the central unit knowing the angular offset between the first defined angular position and the second defined angular position; in a time interval ($I_3$) from the first time point ($t_1$) to the second time point ($t_2$), measuring the rotations of the wheels with corresponding ones of the rpm sensors and transmitting the rotation measurement for each wheel position to the central unit; in the central unit, subtracting a whole number of rotations from each of the rotation measurements to obtain respective angular offsets and then ascertaining which one of the angular offsets corresponds to the angular offset between the first defined angular position and the second defined angular position; and, in the central unit, assigning the individual identifier to the wheel position corresponding to the one angular offset.

The method utilizes the fact that, in a vehicle, the wheels have different rotations because of slip, different tire radii, travel through curves, et cetera.

The basic idea of the invention is the recognition that it is sufficient for the carrying out of the allocation method to measure the angular offset of a wheel of a motor vehicle at two pregiven time points with the aid of rotation sensors. From the signals of the ABS rpm sensors, it can be determined at which wheel of the vehicle the corresponding angular offset is present and a corresponding allocation is made.

The advantages of the invention are especially that the rotation sensors, which are assigned to the tire pressure control devices, are only supplied with energy of the tire pressure control devices during short time intervals. The energy stores are therefore loaded by the rotation sensors only during short time intervals so that their service life is significantly increased. A further advantage of the invention is that the allocation method can nonetheless be carried out with great reliability.

According to a feature of the invention, the first defined angular position corresponds to the second angular position so that the wheel in the time interval from the first time point to the second time point executes a whole number of rotations. In this case, the signals of the rpm sensors must only be checked as to which rpm sensor likewise has registered a whole number of rotations from the first time point to the second time point.

According to another feature of the invention, each time interval, in which the rotation sensors (which are mounted in the tire pressure control devices) are switched on, is a fixed predetermined time span. Preferably, this time span is so dimensioned that the corresponding wheel assumes the defined angular position in a wide speed range of the vehicle within the time span. For example, one second is pregiven as a suitable time span.

According to still another feature of the invention, the sensors assigned to the tire pressure control devices are switched off directly after that time point in which the signal generated by the sensor indicates the defined angular position. The advantage of this embodiment is that the sensors must remain switched on only as long as absolutely necessary. In this embodiment, if the defined angle position after the switch-on of a sensor is not assumed after a pregiven time span (for example, two seconds), then the sensor is automatically switched off after this time span has elapsed. With these measures, it is prevented that the sensor remains switched on over a long time period for a very slow moving vehicle or a vehicle at standstill.

According to still another embodiment of the invention, at the second time point, at least the duration T of the last rotation of the wheel (which the wheel had made before the data transmission) is transmitted in addition to the individual identifier to the central unit from the tire pressure control device. The advantage of this embodiment is that a check is made in the central unit as to whether the transmitted duration T deviates by a large amount from the rotation durations which are supplied by the rpm sensors. If this is the case, then this is an indication for the central unit that the rotation sensor generated an incorrect signal during the pickup of the measuring signal, for example, as a consequence of road surface unevenness. No evaluation of the data of the last time interval then takes place in the central unit.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
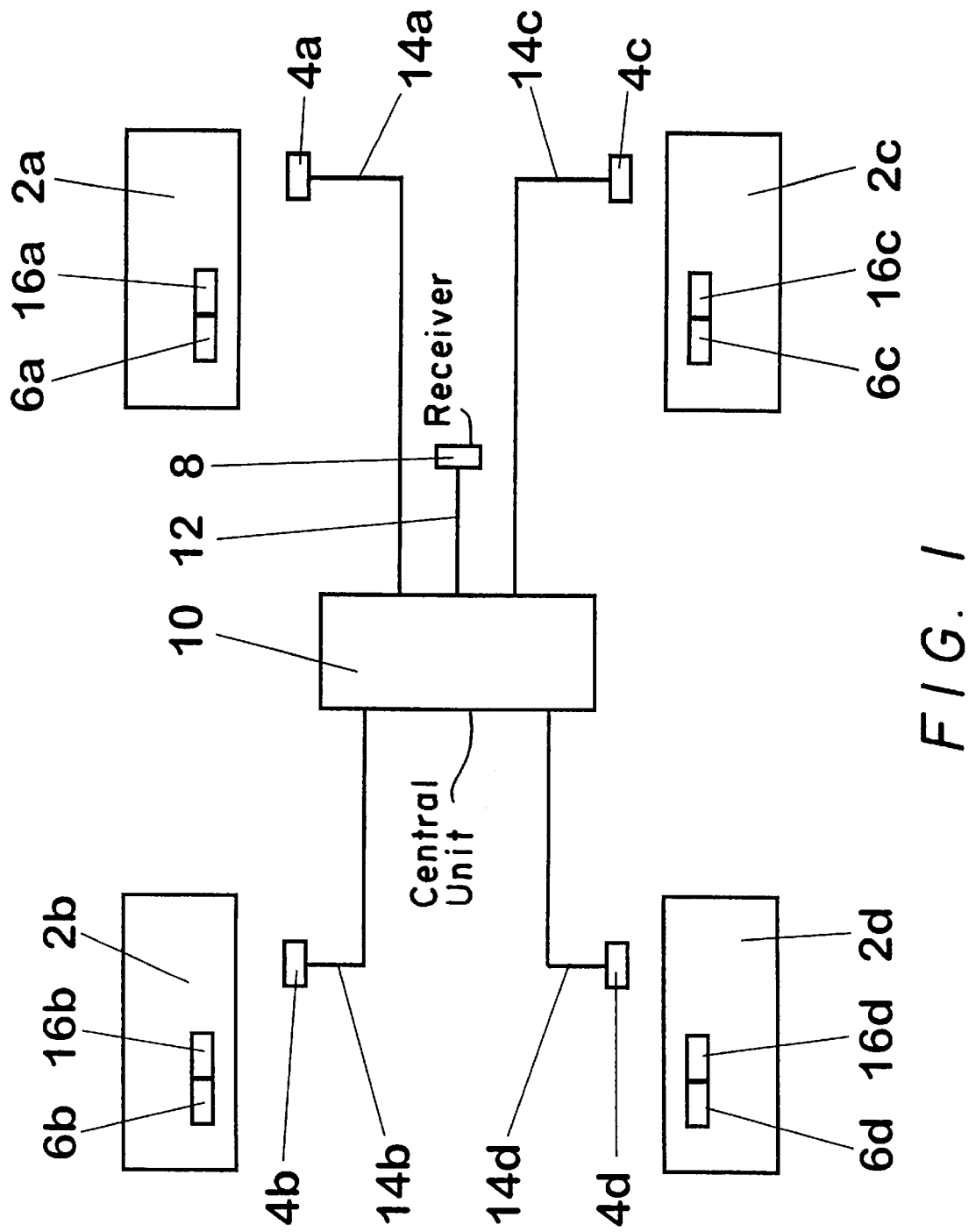
FIG. 1 is a schematic block diagram of the tire pressure control system according to the invention.

FIG. 1 schematically shows a motor vehicle having wheels 2a to 2d. The motor vehicle includes a tire pressure control system which, in turn, includes, inter alia, tire pressure control devices 6a to 6d mounted in respective ones of the tires of the wheels 2a to 2d of the motor vehicle (for example, in the tire rubber or in or at the valve). On the other hand, the tire pressure control devices 6a to 6d can be assigned to respective ones of the tires, for example, by a corresponding positioning and attachment to the wheel rim. The tire pressure control devices 6a to 6d include transmitters which permit the devices to transmit data to a receiver 8 without contact.

Furthermore, the tire pressure control devices 6a to 6d include rotation sensors 16a to 16d which will be described with respect to their function in connection with FIG. 2. The receiver 8 transmits the data, which is received from the tire pressure control devices 6a to 6d, via the transmission path 12 to a central unit 10. In the simplest case, the receiver 8 is configured as a receiving antenna with the aid of which the central unit 10 receives the transmitted data.

The tire pressure control system further includes rpm sensors 4a to 4d which are attached to the motor vehicle and are assigned to respective wheels 2a to 2d of the motor vehicle. The rpm sensors 4a to 4d communicate via transmission paths 14a to 14d with the central unit. The central unit knows (for example, from data stored in a memory) which wheel positions are assigned to the respective rpm sensors 4a to 4d. The central unit 10 knows, for example, that the rpm sensor 4a is assigned to the wheel position "forward left" of the motor vehicle.

Figure 2:
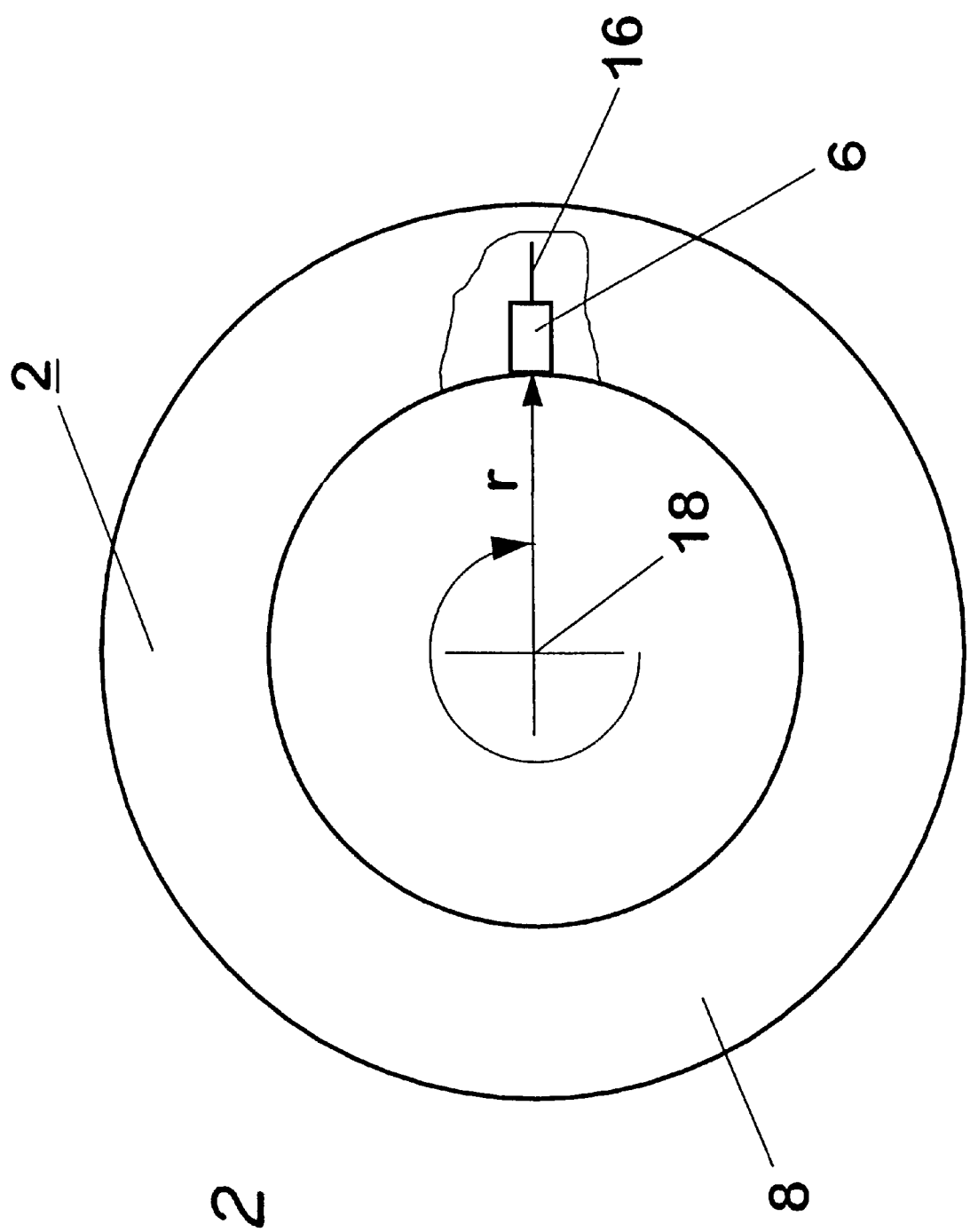
FIG. 2 is a schematic of a wheel of the motor vehicle having a rotation sensor which is mounted on the wheel of the motor vehicle.

FIG. 2 shows a wheel 2 of the motor vehicle having a rotation sensor 16, for example, in the form of a flexural element 16. The wheel 2 of the motor vehicle is rotatably journalled about the axis 18 and the flexural element 16 is mounted on the wheel 2 at a radial distance (r) from the axis 18. With a rotation of the wheel 2 about the axis 18, the flexural element 16 is bent by the gravitational force acting thereupon in dependence upon the angular position of the wheel 2. The flexural element 16 can, for example, be made of piezoelectric material and an electric voltage is generated therein with the bending of the flexural element. The magnitude of this voltage is clearly related to the extent of the bending of the flexural element and therefore to the angular position of the wheel 2.

Figure 3A:
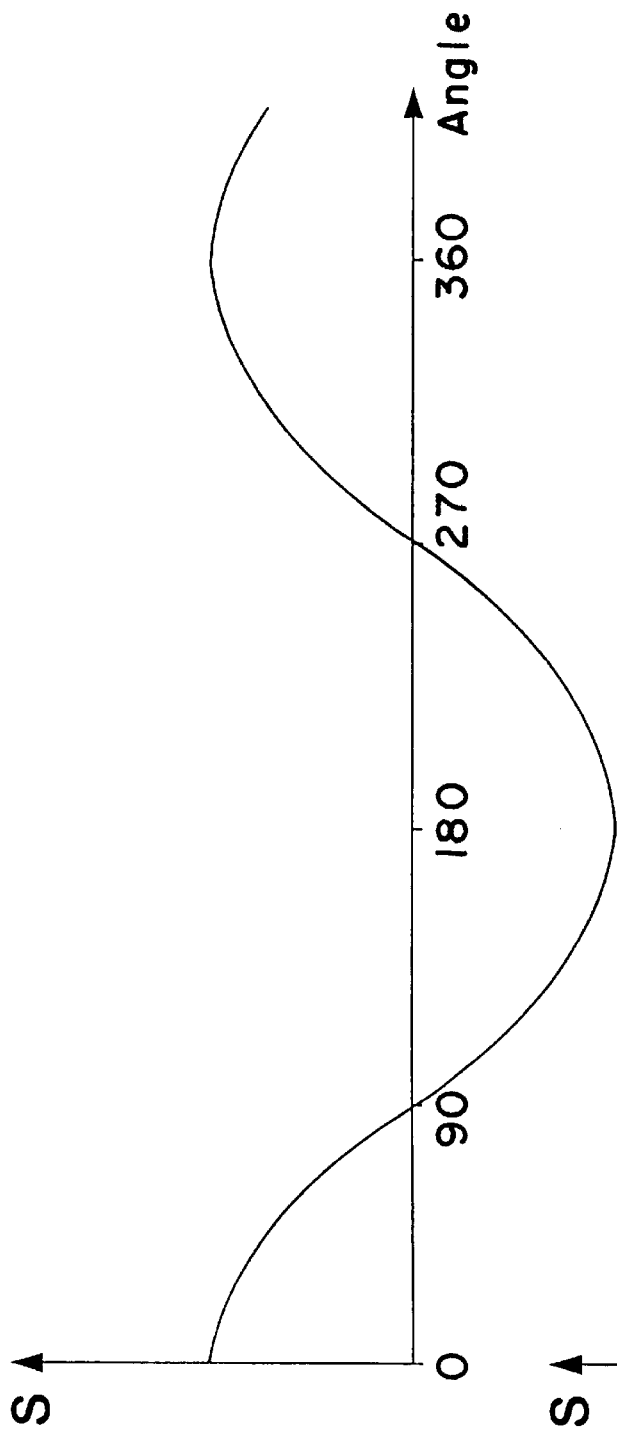
FIG. 3a is a curve showing a signal S generated with the aid of the sensor of FIG. 2 plotted as a function of angular position.

A description will now be provided in connection with FIG. 3 as to how a signal is generated with the aid of the flexural element 16 during a rotation of the wheel 2 about the axis 18. In FIG. 3a, a signal S is plotted as a function of angular position and the angular position shown in FIG. 2 corresponds to 0°.

In the position of the flexural element 16 shown in FIG. 2, the gravitational force (g) runs in the direction of the force-sensitive axis of the flexural element 16 so that the flexural element experiences a maximum bending and therefore generates a maximum signal at the angular position 0°. When the wheel 2 rotates about the axis 18 by 90° out of the position shown in FIG. 2, the force-sensitive axis of the flexural element 16 and the gravitational force (g) are mutually perpendicular so that the flexural element 16 experiences no deformation because of the gravitational force (g) and therefore the signal generated by the flexural element 16 vanishes at the angular position 90°. After a further rotation of the wheel 2 by an additional 90°, the force-sensitive axis of the flexural element 16 again extends in the direction of the gravitational force (g) so that the flexural element is again maximally deformed. However, the deformation is now opposite to the deformation shown in the position of the wheel shown in FIG. 2. Correspondingly, and at an angular position of 180°, the flexural element provides a signal having the same magnitude as for the angular position of 0° but having a negative sign.

After a rotation of a further 90°, the force-sensitive axis of the flexural element 16 is again perpendicular to the gravitational force (g) so that no signal is generated by the flexural element 16 at an angular position of 270°. After a rotation of the wheel 2 about the axis 18 by a further 90°, the position of the flexural element 16 shown in FIG. 2 is again reached so that the force-sensitive axis of the flexural element 16 extends again in the direction of the gravitational force (g) so that the flexural element 16 is again maximally deformed and, at an angular position of (360°, 0°), a maximum signal is again generated.

A periodic signal is generated by the flexural element 16 with a rotation of the wheel 2 about the rotational axis 18. The intensity of the signal is, however, so slight that it must be amplified. This amplification places a load on the battery which supplies the tire pressure control device 6 and the rotation sensor 16 with energy. For this reason, the rotation sensor 16 is only connected to the battery at specific time intervals as will be explained in connection with FIGS. 4a and 4b.

Figure 3B:
FIG. 3b is a waveform of the signal S generated by the rpm sensor plotted as a function of angular position.

FIG. 3b likewise shows a diagram wherein the signal, which is generated by the rpm sensors 4a to 4d, is plotted as a function of the angle. The rpm sensors 4a to 4d can, for example, be ABS sensors which are known per se and have a toothed disc having a specific number of teeth. For a full revolution of the wheel 2 about the axis 18, each tooth of the toothed wheel disc generates a pulse so that the number of pulses in the angular range of 0° to 360° (that is, one revolution of the wheel of the motor vehicle) corresponds to the number of teeth. In FIG. 3b, the signal for an ABS sensor is shown having a toothed disc with 24 teeth so that the signal between 0° and 360° has 24 pulses.

An explanation as to the allocation of the tire pressure control devices 6a to 6d to the wheel positions of the wheels 2a to 2d of the motor vehicle in the tire pressure control system will be explained in connection with FIGS. 4a and 4b.

During a first time interval $I_1$, one of the rotation sensors 16a to 16d is switched on, that is, is connected to the battery which supplies the tire pressure control device and the rotation sensor with energy. During time interval $I_1$, in the tire pressure control device, the signal shown in FIG. 4a is therefore available. From this signal, the tire pressure control device 6 assigned to the rotation sensor can determine when the wheel 2 assumes a defined angular position, the rotation sensor 16 being mounted on the wheel 2. For example, at time point $t_1$, the wheel assumes the angular position 0° and the tire pressure control device can recognize this fact because the signal has its maximum value at this time point. At the time point at which the pregiven defined angular position is reached by the wheel, a data message is transmitted by the tire pressure control device 6 to the central unit. The data message contains at least the individual identifier for the tire pressure control device 6 and a value of the pressure which is present in the tire of the wheel 2. The tire pressure control device can include a pressure sensor for measuring this tire pressure.

The connection of the rotation sensor 16 to the battery is interrupted directly after the transmission of the data message (that is, after the defined angular position was reached) so that no signal which can be evaluated is generated by the rotation sensor 16. After a specific time span dt, the rotation sensor 16 is again connected to the battery for a time interval $I_2$ so that the rotation sensor 16 again generates a signal which can be evaluated during this time interval. The time span dt can, for example, be 30 seconds. Within the time interval $I_2$, a defined position of the wheel 2 (on which the rotation sensor 16 is located) is again determined by the tire pressure control device based on the signal.

At time point $t_2$, the wheel of the motor vehicle assumes the second defined angular position. At this time point $t_2$, a data message is again transmitted from the tire pressure control device 6 to the central unit 10.

Figure 4A:
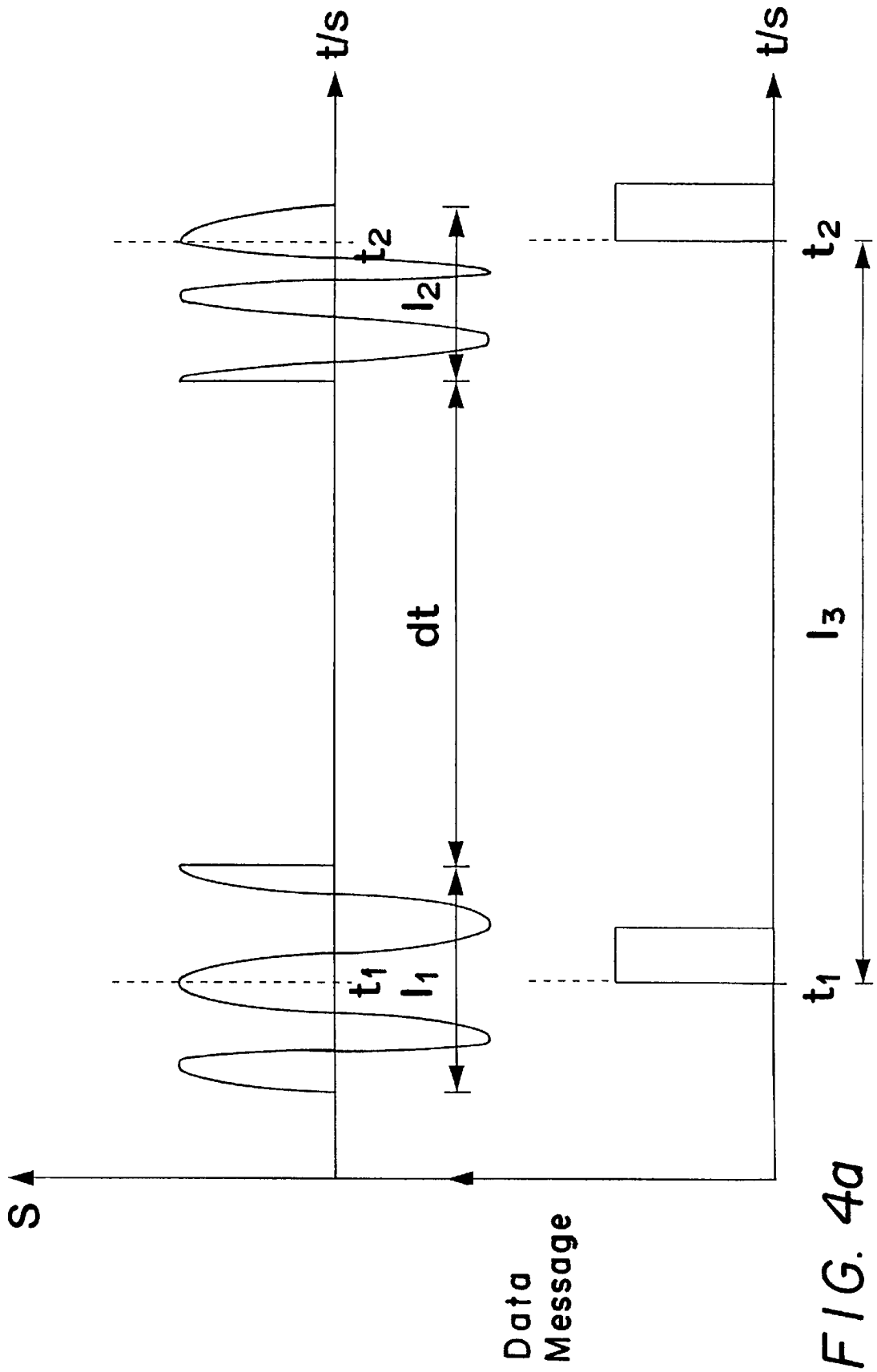
FIG. 4a shows a first curve of a signal S of a rotation sensor plotted as a function of time and a second curve plotted directly therebelow showing the data message of the particular tire pressure control device also plotted as a function of time.

In the embodiment shown in FIG. 4a, the wheel assumes the same defined position (0°) at time point $t_2$ as at time point $t_1$. The wheel 2 of the motor vehicle has passed through a whole number of revolutions in the time interval $I_3$ which is delimited by time points $t_2$ and $t_1$. The angular offset which the wheel 2 assumes at time point $t_2$ compared to $t_1$ therefore vanishes.

The sparing use of the battery of the tire pressure control device results because the rotation sensor is no longer continuously supplied with energy; instead, the rotation sensor is supplied with energy only during short time intervals in which the tire pressure control device determines the defined angular position. The rotation sensor is not supplied with energy during the time intervals therebetween. These time intervals are significantly longer (that is, at least by one order of magnitude longer) than the time intervals in which a supply of energy takes place.

The operation of the central unit 10 will now be explained.

The central unit 10 receives the first data message having the individual identifier at time point $t_1$. At time point $t_2$, the central unit 10 receives a data message having the same individual identifier. The central unit 10 is so programmed that it knows the angular offset between the first defined position and the second defined position.

For the embodiment of FIG. 4a, the above means that the central unit knows that the second data message is only transmitted at time point $t_2$ when the wheel 2 (from which the data message is transmitted) has made a whole number of revolutions. The central unit 10 monitors the signals of all rpm sensors 4a to 4d during the time interval $I_3$. In order to determine from which wheel position the data message was transmitted, the central unit 10 need only check as to which of the rpm sensors 4a to 4d measured a whole number of revolutions in the time interval $I_3$. The corresponding assignment (identifier of the tire pressure control device/wheel position) is stored in the central unit 10 after the check.

EXAMPLE

Figure 4B:
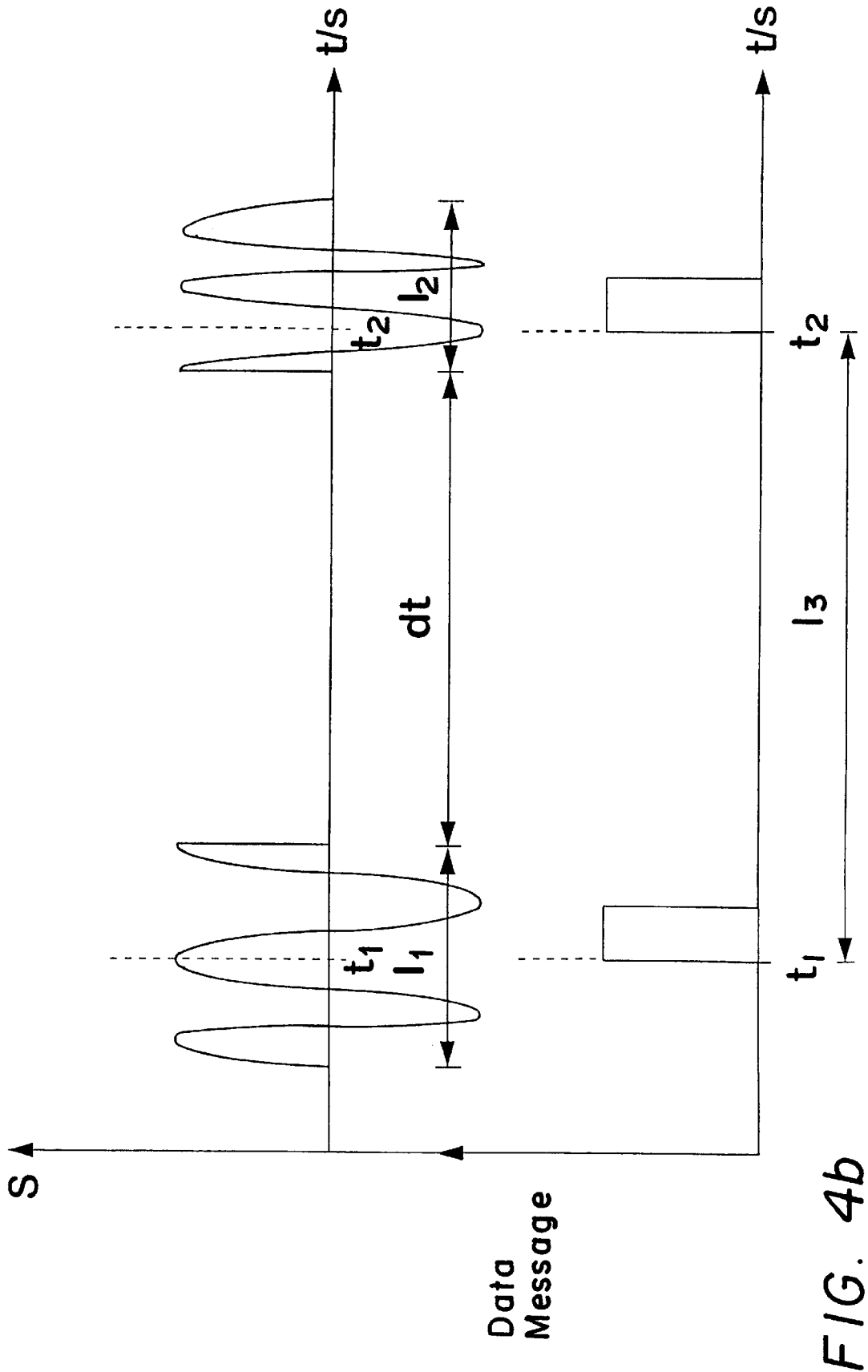
FIG. 4b shows a first waveform of the signal S plotted as a function of time and a second curve of the data message also plotted as a function of time directly therebelow; and, FIG. 5 is a block diagram of a tire pressure control device according to an embodiment of the invention.

The data messages shown in FIGS. 4a and 4b are transmitted to the central unit from the wheel 2a of the motor vehicle, that is, from the position front left. This, however, the central unit 10 does not yet know. In the time interval $I_3$, the signals of the rpm sensors 4a to 4d are also evaluated in the central unit 10. In this way, a determination is made in the central unit 10 that the signal of the rpm sensor 4a has 2,400 pulses, the signal of rpm sensor 4b has 2,450 pulses, the signal of rpm sensor 4c has 2,470 pulses and the signal of rpm sensor 4d has 2,416 pulses. It is here assumed that the rpm sensors 4a to 4d operate with toothed discs each having 24 teeth. Based on the signals, the central unit 10 can determine that only the wheel to which the rpm sensor 4a is assigned has made a whole number of revolutions in the time interval $I_3$, that is, only the number 2,400 pulses can be divided by 24 without a remainder. For this reason, the central unit 10 knows that the data message, which is shown in FIG. 4a, has been transmitted from the wheel 2a and therefore from the wheel position "forward left". The individual identifier contained in the data messages can therefore be stored with the wheel position "forward left"in the central unit 10. Correspondingly, the assignment of the other tire pressure control devices 16b, 16c and 16d to the wheel positions of the motor vehicle are made. If no clear assignment or allocation can be made, for example, because two ABS sensors have measured a whole number of revolutions, then the method is repeated.

FIG. 4b shows a diagram which substantially corresponds to the diagram of FIG. 4a. The only difference is that the angular offset in the position of the wheel of the vehicle between the time point $t_2$ and time point $t_1$ is not 0° but instead is 180°. In the central unit 10, the allocation method is conducted in the same manner as was explained above in connection with FIG. 4a. The only difference here is that the central unit 10 does not have to look for a signal of an rpm sensor 4a to 4d whose pulse number leaves a 0 remainder after being divided by 24; rather, the central unit 10 must look for a signal whose pulse number has a remainder of 12 after a division by 24 (for a number of 24 pulses per revolution of the wheel 2, a pulse number of 12 corresponds to an angular offset of 180°). In the same way, the method can be carried out for any desired angular offset.

Figure 5:
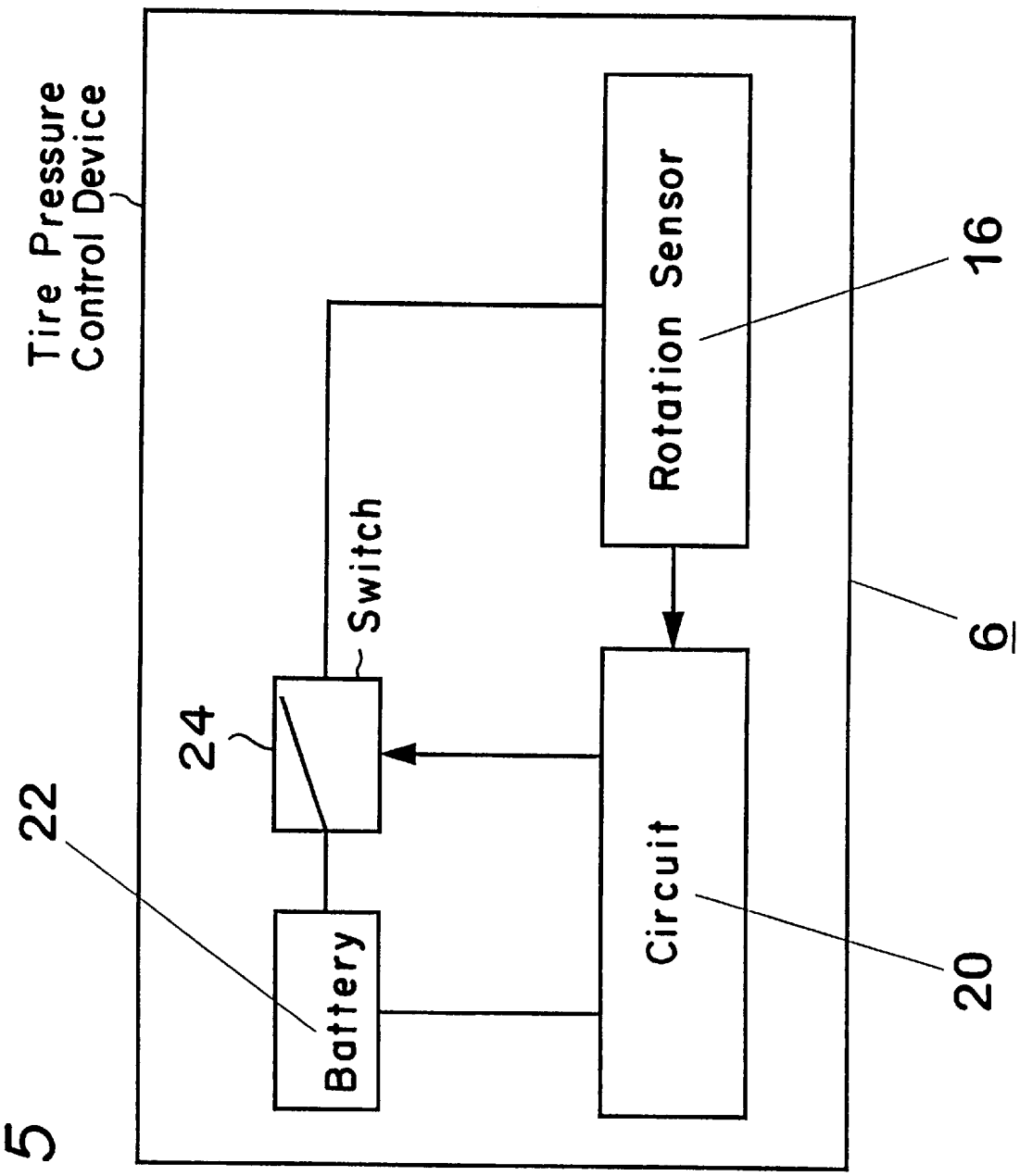

FIG. 5 is a schematic showing a tire pressure control device 6 which includes, inter alia, a circuit 20, a battery 22 and an rotation sensor 16. The circuit 20 is continuously supplied with energy by the battery 22. The circuit 20 is so configured that it generally interrupts the energy supply of the rotation sensor 16 from the battery 22 (indicated by the opened switch 24 in FIG. 5) and connects the battery 22 to the rotation sensor 16 only at specific time intervals (see, for example, the time intervals $I_1$, and $I_1$ in FIGS. 4a and 4b).

It is understood that the foregoing description is that of the preferred embodiments of the invention and that various changes and modifications may be made thereto without departing from the spirit and scope of the invention as defined in the appended claims.

What is claimed is:

1. In a tire pressure control system of a motor vehicle having a plurality of wheels at respective predetermined wheel positions, a method for carrying out an allocation of tire pressure control devices of a tire pressure control system to the predetermined wheel positions of the motor vehicle, the system further including:

a central unit;

each of said tire pressure control devices functioning to transmit an individual identifier to said central unit at time intervals and being assignable to a corresponding one of said wheels and the assignment (identifier/wheel position) being stored in said central unit;

a plurality of rpm sensors assigned to corresponding ones of said wheels and said rpm sensors being fixedly mounted at respective ones of said wheel positions;

said central unit storing the allocation of said rpm sensors to said wheel positions, respectively;

a plurality of rotation sensors assigned to corresponding ones of said tire pressure control devices;

the method comprising the steps of:

switching on any one of said rotation sensors for a first time interval ($I_1$) whereby said rotation sensor supplies a rotation sensor signal;

during said first time interval ($I_1$), determining a first angular position of the one wheel to which said one rotation sensor is assigned from said rotation sensor signal;

the tire pressure control device corresponding to said one wheel transmitting the individual identifier thereof to said central unit at a first time point ($t_1$) when said wheel assumes said first angular position;

later switching on said one rotation sensor for a second time interval ($I_2$);

during said second time interval ($I_2$), determining a second angular position of the one wheel to which said one rotation sensor is assigned from said rotation sensor signal with said first angular position and said second angular position conjointly defining an angular offset;

the tire pressure control device corresponding to said one wheel transmitting the individual identifier thereof to said central unit at a second time point ($t_2$) when said one wheel assumes said second angular position with said central unit knowing said angular offset between said first defined angular position and said second defined angular position;

in a time interval ($I_3$) from said first time point ($t_1$) to said second time point ($t_2$), measuring the rotations of said wheels with corresponding ones of said rpm sensors and transmitting the rotation measurement for each wheel position to said central unit;

in said central unit, subtracting a whole number of rotations from each of said rotation measurements to obtain respective angular offsets and then ascertaining which one of said angular offsets corresponds to said angular offset between said first defined angular position and said second defined angular position; and, in said central unit, assigning the individual identifier to the wheel position corresponding to said one angular offset.

2. The method of claim 1, wherein said first defined angular position is coincident with said second defined angular position so that the wheel completes a whole number of rotations in the time interval from said first time point to said second time point.

3. The method of claim 1, wherein the time interval, in which said rotation sensors are switched on, is a fixed pregiven time span.

4. The method of claim 1, wherein said rotation sensors, after being switched on, are switched off directly after the time point at which the signal, which is generated by the corresponding sensor, indicates the defined angular position.

5. The method of claim 1, wherein said tire pressure control device corresponding to said one wheel transmits said individual identifier thereof as a data transmission at said second time point ($t_2$) and said one wheel makes a last rotation before said data transmission over a time duration (T); and, at the second time point ($t_2$), at least the duration (T) of the last rotation of the wheel, which the wheel made before said data transmission, is transmitted from the tire pressure control device to said central unit in addition to the transmission of the individual identifier.

* * * * *